United States Patent [19]

Hamar

[11] Patent Number: 4,483,618

[45] Date of Patent: Nov. 20, 1984

[54] LASER MEASUREMENT SYSTEM, VIRTUAL DETECTOR PROBE AND CARRIAGE YAW COMPENSATOR

[76] Inventor: Martin R. Hamar, 70 Linden Tree Rd., Wilton, Conn. 06897

[21] Appl. No.: 381,078

[22] Filed: May 24, 1982

[51] Int. Cl.³ ............................................. G01B 11/00
[52] U.S. Cl. ...................................... 356/400; 33/286; 356/383
[58] Field of Search ............... 356/399, 400, 401, 376, 356/153, 375, 154, 383; 33/174 P, 286, 234

[56] References Cited

U.S. PATENT DOCUMENTS

| | | | |
|---|---|---|---|
| 3,723,013 | 3/1973 | Stirland et al. | 356/400 |
| 3,734,627 | 5/1973 | Edwards | 356/399 |
| 3,765,764 | 10/1973 | Niss | 356/372 |
| 3,799,674 | 3/1974 | Guillet et al. | 356/399 |
| 3,824,020 | 7/1974 | Pease | 356/400 |
| 3,902,810 | 9/1975 | Hamar | 356/400 |
| 4,045,129 | 8/1977 | Hamar | 350/321 |
| 4,105,339 | 8/1978 | Wirtanen | 356/400 |
| 4,297,031 | 10/1981 | Hamar | 356/247 |

*Primary Examiner*—R. A. Rosenberger
*Attorney, Agent, or Firm*—Anthony J. Casella; Gerald E. Hespos

[57] ABSTRACT

A technique for measuring the distance between two points on an object along a laser beam axis, along with devices and methods of reducing measurement errors in such laser measurement systems are disclosed. The laser measurement system includes a source laser, a rotatable penta-prism for reflecting the source through 90° and for generating a plane perpendicular to the source upon rotation thereof, and a carriage upon which the penta-prism is mounted to allow the penta-prism to be moved parallel to the source. The position of the penta-prism along the source is adjusted until alignment with the two points on the object is detected, at which time the positions of the penta-prism which produce the alignments are noted on a scale parallel to the source. A virtual detector probe including an optical detector, at least one mirror and a probe adapted to be placed on each of the two points causes the target point of the optical detector to be virtually located at the associated point on the object when the probe is placed on the desired point, by relatively disposing the optical detector, the mirror and the probe at predetermined locations. The virtual location of the target point of the optical detector at the desired point will be substantially unaffected by movements of the optical device as long as the probe remains on the desired target. In this manner, an optical detector may be virtually placed at locations on a body to be measured which cannot otherwise be physically accomplished. The virtual detector probe may alternatively be used as a carriage yaw compensator for compensating for any errors in measurement due to non-linearities in the carriage upon which the penta-prism is mounted.

23 Claims, 12 Drawing Figures

LASER MEASUREMENT SYSTEM, VIRTUAL DETECTOR PROBE AND CARRIAGE YAW COMPENSATOR

DESCRIPTION OF THE INVENTION

The present invention is directed to a laser measurement system, and more particularly, to a laser measurement system which functions to remotely measure the position of an object.

Laser alignment systems provide for the deflection of a laser beam through a precise 90° angle utilizing a penta-prism which is rotated to sweep out a flat plane perpendicular to the input laser beam. Such devices are disclosed in U.S. Pat. No. 4,297,031 by Martin R. Hamar and its continuation-in-part application Ser. No. 313,965, filed Oct. 22, 1981, now U.S. Pat. No. 4,382,680 the entire disclosures of which are hereby incorporated by reference.

Specifically, the laser alignment systems described above may utilize a single laser beam to generate a plurality of parallel planes at any desired location along the laser beam axis, each of the planes being perpendicular to the laser beam, and therefore mutually parallel, within very high tolerances, i.e., on the order of small fractions of an arc-second. The parallel planes are generated by rotating a penta-prism through 360°, the penta-prism functioning to reflect the incident laser beam through a 90° angle.

It is a first object of the invention to provide a technique for measuring the distance along the laser beam axis between two points on an object utilizing the laser alignment devices described above.

In accordance with the first aspect of the invention, a laser measurement system for measuring the distance between two points on an object along a first axis includes a laser source, a penta-prism module and a carriage upon which the penta-prism is slidably mounted and a scale. The laser source provides an incident laser beam substantially parallel to the first axis. The penta-prism module is provided for reflecting the incident laser beam through a 90° angle. The penta-prism module is rotatable to generate a plane substantially perpendicular to the incident laser beam using the reflected laser beam. The carriage upon which the penta-prism module is mounted allows the module to be moved substantially parallel to the first axis until an alignment of the reflected beam produced by the module with the first of the two points is detected. The module is then further moved until a second alignment of the reflected beam and a second of the two points is detected. An indicator, such as a cursor, or the like which is operatively connected to the module indicates on the scale the locations of the module which produce the first and second alignments. The distance between the two points along the first axis can then be determined from the two points on the scale.

In accordance with a second aspect of the invention, a method for measuring the distance between two points on an object along a first axis includes the step of reflecting a source laser beam in a penta-prism to provide a reflected laser beam perpendicular to the source laser beam. The penta-prism is then moved substantially parallel to the source laser beam until a first alignment of the reflected laser beam with a first of the two points is detected. The penta-prism is further moved substantially parallel to the source laser until a second alignment of the reflected laser beam with a second of the two points is detected. The positions of the penta-prism module which produce the first and second alignments are read along a scale disposed substantially parallel to the source laser beam to thereby measure the distance between the two points.

When the system is used in such a manner, there exist sources of measurement errors which, although small, may be significant, especially in view of the precision available with such laser alignment systems. For example, if the position of an edge of a solid object in the middle of the plane face which forms the edge must be measured, the null, or center portion, of the above-mentioned optical detector must be off-set from the exact point to be measured due to the physical extent of the detector. Secondly, it is often times necessary to measure the position of the interior of a bore or other concave arrangement which is physically inaccessible to the optical detector. In such cases, the detector must be positioned at a convenient location near the bore, and the relative locations of the bore and the detector estimated and compensated for. Both techniques become a limiting factor on precision and accuracy available in laser measurement systems.

Further measurement errors may be produced in the event that a yaw error is present in reading the scale due to a skewed disposition of the carriage upon which the penta-prism assembly moves. More specifically, a determination of the relative position of the generated plane is determined by taking a reading from the above mentioned scale. The scale may be any well known type of position indicating device, such as an ordinary graduated scale, a laser interferometer, a rack and pinion assembly, and the like. The planes are generated and the penta-prism assembly is moved along the carriage until a null output is provided by the appropriate detector, at which time the position of the penta-prism assembly along the scale is noted, by examining the location of a pointer or cursor attached to the penta-prism module relative to the scale. In the event that the carriage upon which the penta-prism travels in not precisely straight, a yaw error may exist whereby the pointer or cursor indicates a false location on the scale.

It is therefore another object of the invention to increase the precision and accuracy available in the above-described laser measurement systems.

It is a further object of the invention to provide a sensor probe which can readily be placed at substantially any location on an object to be measured, the detector probe functioning to provide a virtual position of the detector at any desired location.

It is a further object of the invention to provide a carriage yaw compensator for compensating for any non-linearities in the carriage for the penta-prism module.

It is a further object of the invention to provide a method for reducing measurement error in a laser alignment system by providing a virtual detector position at the exact location desired to be measured.

It is a further object of the invention to provide a method of compensating for yaw due to non-linearities in the penta-prism module carriage.

According to a third aspect of the invention, an optical device for use with a laser broadly includes an optical detector having a target point, at least one mirror, and a probe separate from the optical detector and adapted to be placed on a desired measurement point. The optical detector, the mirror and the probe are relatively disposed such that the target point of the optical detector is virtually located at the desired measurement point when the probe is placed on the desired measurement point.

According to the fundamental principle of the optical device, the virtual location of the target point of the optical detector at the desired measurement point will be substantially unaffected by movements of the optical device as long as the probe remains on the desired measurement point. This is accomplished by making the distance between a given point on the mirror and the end of the probe substantially equal to the optical distance between the given point on the mirror and the target point. The relative angles of the probe axis and the optical path axis need not be fixed to any particular value. Further, the device functions properly with any number of mirrors.

In accordance with a specific embodiment, the optical device may further include a collimator for detecting the angle of incidence of the laser beam on the device. The collimator includes a beam splitter disposed between the mirror and the first optical detector for passing a first portion of the laser beam to the first optical detector and for reflecting a second portion of the laser beam toward a second optical detector via a focusing lens. The second optical detector is located substantially at the focal point of the lens, whereby the second optical detector can detect the angle of incidence of the laser beam on the optical device.

According to a fourth aspect of the invention, a method of detecting the apparent location of a laser beam relative to a desired target includes the steps of disposing at least one mirror at a preselected distance from the desired measurement point, reflecting the laser beam off the mirror and detecting the location of the reflected laser beam relative to an optical detector physically removed from the desired measurement point and optically separated from the mirror substantially by the preselected distance.

Fundamentally, such an optical detector is virtually located at the desired measurement point when the mirror is disposed at the preselected distance from the desired measurement point.

According to a specific embodiment, the detection method further includes the step of detecting the angle of incidence of the laser beam on the first optical detector. The angle of incidence may be determined by disposing a beam splitter between the mirror and the first optical detector for passing a first portion of the laser beam to the first optical detector and for reflecting a second portion of the laser beam toward a second optical detector via a focusing lens, and disposing the second optical detector substantially at the focal point of the lens, whereby the second optical detector can detect the angle of incidence.

In accordance with a fifth aspect of the invention, a yaw error compensator for use with the laser measurement system comprises a housing adapted to be placed substantially adjacent to a scale in the measurement system, an optical detector having a target point, at least one mirror adapted to reflect a laser beam toward the optical detector, and an indicator disposed on the housing, the optical detector and the mirror relatively disposed on the housing such that the distance between a given point on the mirror and the indicator being substantially equal to the optical distance between the given point and the target point.

The fundamental principle discussed above with reference to the optical detector of the third and fourth aspects of the invention is equally applicable to the yaw error compensator as well.

In accordance with a sixth aspect of the invention, a method for detecting an error in the indicated position on a measurement scale produced by an indicator operatively disposed on a rotatable penta-prism in a laser measurement system, wherein the penta-prism reflects an incident laser beam substantially perpendicular to the incident laser beam, includes the steps of disposing at least one mirror at a predetermined angle and distance relative to the indicated position on the scale, disposing an optical detector having a target point at a predetermined position relative to the mirror and the indicated position, rotating the penta-prism such that the laser beam reflected by the penta-prism is further reflected by the mirror, and detecting the location of the laser beam reflected by the mirror relative to the optical detector, to thereby determine the error. Specifically, the steps of disposing are performed such that the distance between a given point on the mirror and the indicated position is substantially equal to the distance between the given point and the target point.

These and other objects, aspects and embodiments of the invention will be more fully described with reference to the following drawing figures of which.

Figure 1:
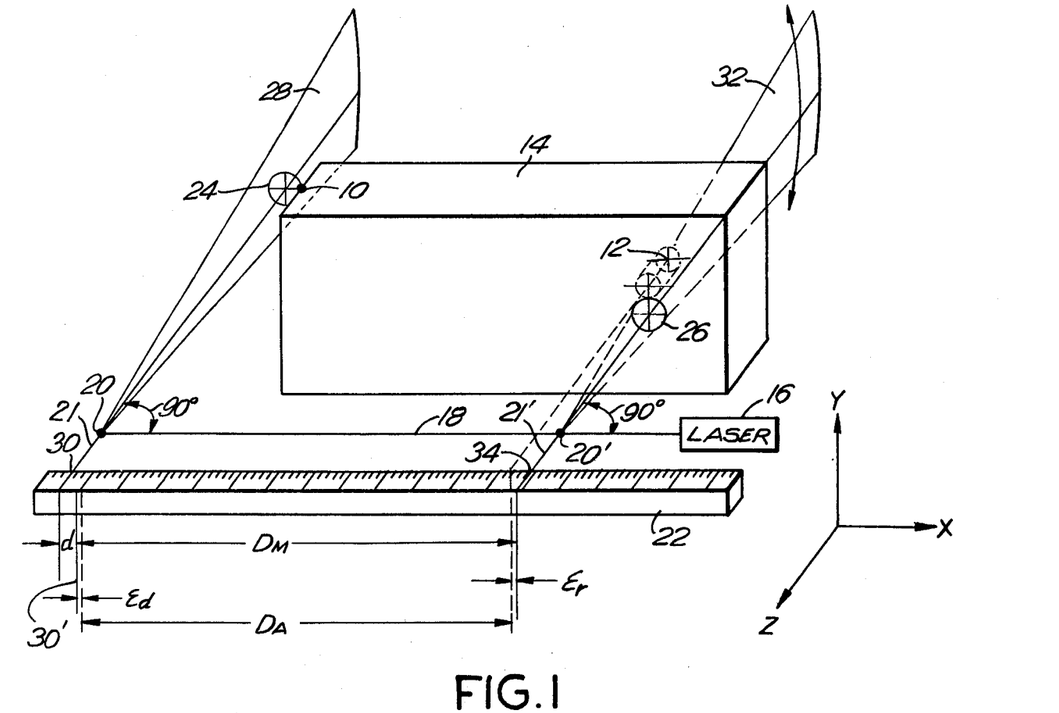
FIG. 1 is a perspective diagram illustrating one example of the laser measurement system according to the first aspect of the present invention.

FIG. 1 illustrates the laser measurement system according to the present invention for determining the distance along the X axis between target points 10 and 12 at particular locations on a solid object 14. It should be noted that the particular system shown in FIG. 1 is merely exemplary. The devices and methods according to the present invention readily lend themselves to use in many other types of laser measurement and alignment systems, as will be apparent to those skilled in the art.

The laser measurement system includes a laser 16 which produces a laser beam 18 which will be defined for the purposes of the following discussion to be along the X axis as shown. Also included in the alignment system is one or more penta-prism modules, symbolically shown at points 20 and 20'. The actual measurement between points 10 and 12 along the X axis is performed on measurement scale 22, also disposed substantially parallel to the X axis.

The measurement system measures the distance in the X direction between points 10 and 12 in the following manner. Detectors 24 and 26, which function to detect a "null" or dead center position of a beam of light applied thereto, are located as close to points 10 and 12 as is physically possible. Although detectors 24 and 26 are shown as being of the four quandrant type, other types of well known detectors may be used as well.

To measure the distance in the X direction between points 10 and 12, the penta-prism module 20 will initially be located in the general vicinity shown in FIG. 1 and adjusted in either direction along the X axis while being rotated about the X axis so as to generate a plane 28 perpendicular to the axis of laser beam 18. The position of the module 20 along the X axis is adjusted so as to produce a null output from detector 24, thereby indicating alignment therewith. The location of the plane 28 in the X direction can therefore be determined by noting the position of marker or cursor 21, which is attached to the module 20, on the measurement scale 22. In FIG. 1, cursor 21 falls at point 30 on the measurement scale 22.

The penta-prism 20 may then be moved in the X direction, on a penta-prism module carriage (not shown) toward laser 16 to the general vicinity shown by reference numeral 20'. Alternatively, separate penta-prisms may be employed. In a similar manner, the location of the penta-prism is adjusted such that the plane 32 which it generates produces a null indication at detector 24. A reading of the position of the cursor 21' in the X direction is taken from point 34 on the measurement scale 22.

Through the use of the penta-prism module described in the above U.S. Pat. Nos. 4,297,031 and 4,382,680 as well as the co-pending U.S. Patent Application Ser. No. 381,079, by Martin R. Hamar, filed concurrently herewith, the user is assured of sweeping truly flat, parallel planes 28 and 32, both of which are perpendicular to the laser beam axis 18 to within extremely high tolerances.

It can be appreciated that a source of measurement inaccuracies in the system illustrated in FIG. 1 lies with the exact placement and physical dimensions of the detectors 24 and 26. Since detector 24 cannot be placed dead center at the desired measurement point 10, the user must compensate for the actual physical dimensions of the detector in determining the location on target point 10. This is typically accomplished by simply subtracting the distance between the point to be measured (point 10) from dead center of the detector, in the case of FIG. 1, the dimension "d", to thereby produce an apparent measurement of the position of plane 28 at point 30'. In the case of the measurement of target point 12 as shown in FIG. 1, the user would ordinarily try to align the center of detector 26 with point 12 in the X direction such that no such compensation factor need be considered for the measurement of point 12.

Determination of points 10 and 12 in the above described manner will produce a measured distance $D_M$ from point 30' to point 34 as shown in FIG. 1. However, the actual distance $D_A$ between points 10 and 12 may differ from the measured distance due to an error $\epsilon_d$, in determining the particular dimensions of the detector 24 or in its placement proximate to point 10, and an error $\epsilon_r$, due to the remote placement of detector 26 relative to point 12. Error $\epsilon_r$ may arise from either incorrect alignment of detector 26 with point 12 or in the event that the bore in which point 12 is located is not exactly parallel to the Z axis.

Figures 2, 3:
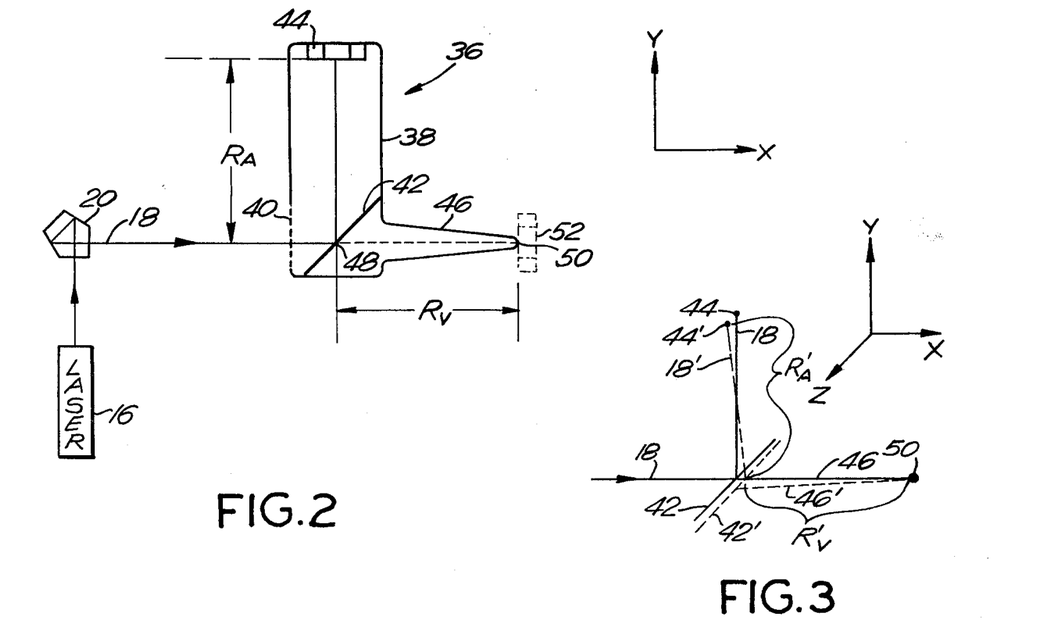
FIG. 2 is a diagram illustrating the virtual detector probe in accordance with a first embodiment of another aspect of the invention.
FIG. 3 is a geometric construction diagram illustrating the principle embodied in the virtual detector probe of the present invention.

The virtual detector probe in accordance with the present invention allows a straightforward detection technique which essentially eliminates such errors by providing a virtual location of a detector at a point remote from the actual location thereof. With reference to FIG. 2, the virtual detector probe 36 includes main body 38 having a window 40 formed therein, full reflecting mirror 42, optical detector 44 and probe 46. In the case of the virtual detector probe shown in FIG. 2, a single mirror 42 is disposed at a 45° angle relative to the axes of the main body 38 and probe 46. However, as will become apparent with reference to the additional embodiments of the invention, a single mirror at a 45° angle relative to the main body and probe portions is not required. The only requirement of the virtual detector probe in accordance with the present invention is that the dimensions $R_A$ and $R_V$ be substantially identical. $R_A$ is the actual distance between any particular point (i.e., point 48) on mirror 42 and the target point (dead center) of detector 44, and $R_v$ is the distance from the same point on the mirror to the end of the probe portion 46.

The virtual detector probe 36 is adapted to be used in the measurement system illustrated in FIG. 1 in the following manner. Rather than providing detectors 24 or 26 which can only be remotely positioned relative to the desired measurement points 10 and 12, the tip 50 of the probe portion 46 is placed at the desired measurement point 10 or 12, and the laser beam 18 is directed through window 40 to mirror 42. The virtual detector probe functions to provide a virtual position 52 of detector 44, the virtual position 52 having a dead center at point 50 at the tip of the probe. Thus when beam 18 is aligned dead center with the virtual position 52, a dead center indication will also be produced by detector 44. In other words, the actual position of detector 44 may be thought of as being projected to a virtual position 52. Thus, an optical detector may be virtually placed exactly at the desired measurement points 10 or 12, or any other point which would otherwise be physically inaccessible to a detector.

The virtual detector probe is functionally much more than a simple reflection of beam 18 to a more convenient location. By specifically designing the values of $R_A$ and $R_V$ to be essentially identical, a perfect compensation for movement of the probe about point 50 occurs, as will be explained with reference to FIG. 3.

FIG. 3 is a symbolic illustration of the arrangement shown in FIG. 2. First, assuming that the axis of probe 36 is initially parallel to the X axis, and that beam 18 is directed to the target point 50, mirror 42 will be oriented at 45° relative to the beam 18, causing laser beam to be reflected directly to the dead center point of detector 44. In the example shown in FIG. 3, a rotation of the virtual detector probe about point 50 through the X axis (movement in the X-Y plane) is shown. This produces a translation of probe 46 to the location designated by reference numeral 46', an angular and spacial translation of mirror 42 to the position indicated by reference numeral 42' and the associated change in distance $R_V$ to that shown as $R'_V$ and the translation of the dead center point of detector 44 to the location indicated by reference numeral 44'. The angular and spacial translation of mirror 42 to 42' produces an associated translation of the reflected laser beam to the path illustrated by reference numeral 18', and the associated change in distance $R_A$ to that shown as $R'_A$. As shown in FIG. 3, the reflected laser beam 18' is still directed to the dead center portion 44' of the detector. Thus, when the values of $R_A$ and $R_V$ are equal, (as shown in FIG. 2), the translation of the reflected beam 18' due to rotation about point 50 is perfectly compensated for by the associated translation of dead center point 44', the new values of $R'_A$ and $R'_V$ also being equal. This analysis holds equally true for rotation in any direction about point 50, as long as the tip 50 of the probe remains fixed. However, even a mirror relative translation of the laser beam axis from point 50 will cause the reflected beam 18 (or 18') to fall at a point other than the dead center point 44 (or 44'). It is readily apparent that this is exactly the desired result, since the incident laser beam 18 would not otherwise fall on target point 50 since they have been relatively translated.

The virtual detector probe can therefore be viewed as an apparatus which allows an optical detector to be projected to the tip 50 of the probe portion 46, without actually having to physically position a detector at that point. Thus, by placing the detector probe 46 at any point in space, on a surface, or within an object, the actual detector is projected to the virtual position indicated at 52, FIG. 2.

Figure 4:
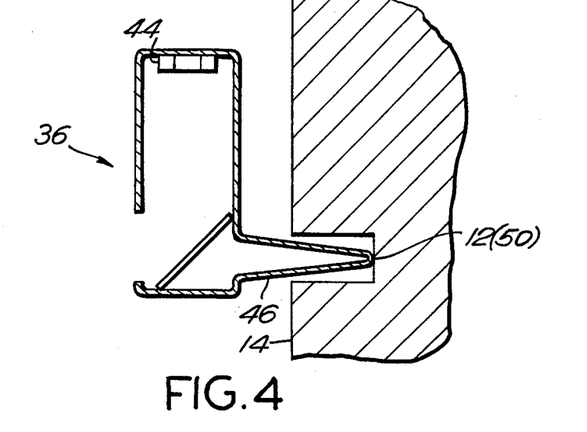
FIG. 4 is a cross-section diagram illustrating one possible use of the virtual detector probe of FIG. 2.

Use of the virtual detector probe in the arrangement illustrated in FIG. 1 as shown in FIG. 4. The probe 46 may actually be placed into the bore containing target point 12, thereby positioning the probe tip 50 at the target point to provide the virtual detector thereat. As long as the probe tip 50 remains on measurement point 12, dead center of detector 44 will be projected to the measurement point 12, movement in any direction about point 12 not having any effect on the measurement.

Figure 5:
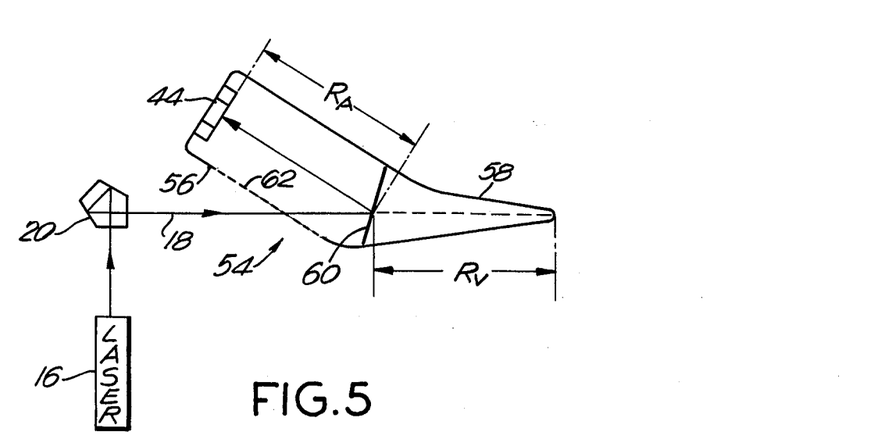
FIG. 5 is a diagram illustrating the virtual detector probe in accordance with a second embodiment.
Figure 6:
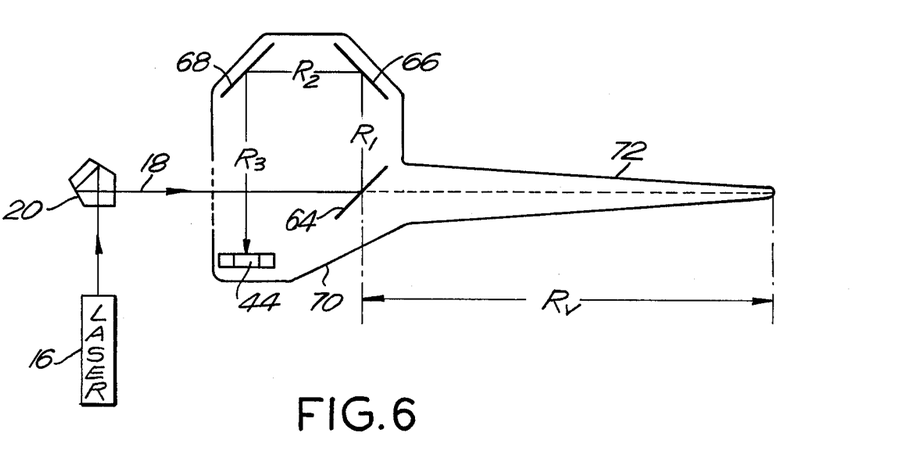
FIG. 6 is a diagram illustrating the virtual detector probe in accordance with a third embodiment.

FIGS. 5 and 6 illustrate alternative embodiments of the virtual detector probe which incorporate the same principles utilized in the first embodiment of FIG. 2. Therefore, the differences between the alternative embodiments will be discussed, the above analysis applying to the alternative embodiments as well.

First, the mirror does not necessarily have to be positioned at the 45° angle relative to the probe portion and main body of the virtual detector probe. In FIG. 5, a virtual detector probe 54 is illustrated as having a greater than 90° angle between the main body 56 and probe portion 58. The mirror 60 is angled such that the incident laser beam 18 which passes through window or opening 62 strikes the mirror such that the angle between the incident and reflected beams is usually less than 90°, although angles greater than 90° are capable of being achieved for particular orientations of probe 54. The only requirement of the probe is that the distances $R_A$ and $R_V$ be essentially equal, $R_A$ and $R_V$ being defined in a manner identical to that as explained with reference to FIG. 2. Thus, the relative angles between the main body and probe portions may be designed to measure specially shaped objects.

Secondly, the virtual detector probe need not be limited to a single mirror and may employ any number of mirrors as desired. The embodiment illustrated in FIG. 6 employs three such mirrors 64, 66 and 68 in main body 70. The distance $R_V$ is determined in the same manner as with the first two embodiments, but the distance $R_A$ must be determined by adding the component paths R1–R3 in order to determine the total path length, or optical distance from mirror 64 to the surface of detector 44. Since this total path length is "folded" into a compact structure, the FIG. 6 embodiment is useful when a long probe 72 is required.

The FIG. 5 and FIG. 6 embodiments may be combined such that an odd number of mirrors are disposed within the main body at relative angles other than 45°. Further, one or more of the mirrors may be oriented such that the optical path is three dimensional, i.e., out of the plane of the drawings, without affecting the operation of the probe.

Figure 7:
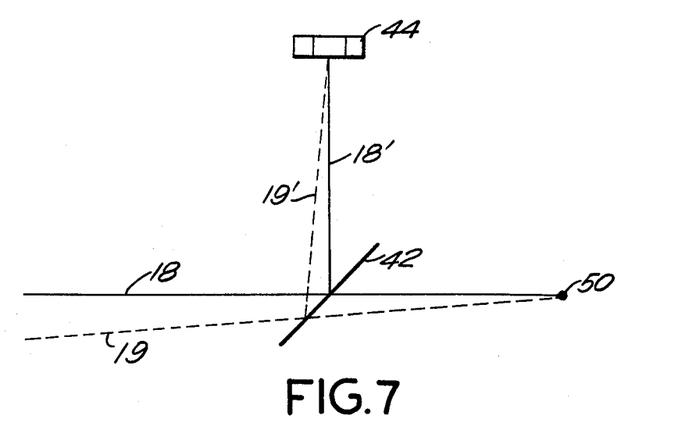
FIG. 7 is another geometric construction diagram illustrating the principal embodied in the virtual detector probe.

A further embodiment of the virtual detector probe will now be discussed with reference to FIGS. 7–9. FIG. 7 illustrates the principle of the virtual detector probe in a manner similar to that illustrated in FIG. 3. Both incident laser beams 18 and 19 are directed toward point 50 and therefore reflect off mirror 42 to produce reflected beams 18' and 19', both directed to dead center of detector 44, as will any incident beam which is directed toward point 50, regardless of its orientation.

Figure 8:
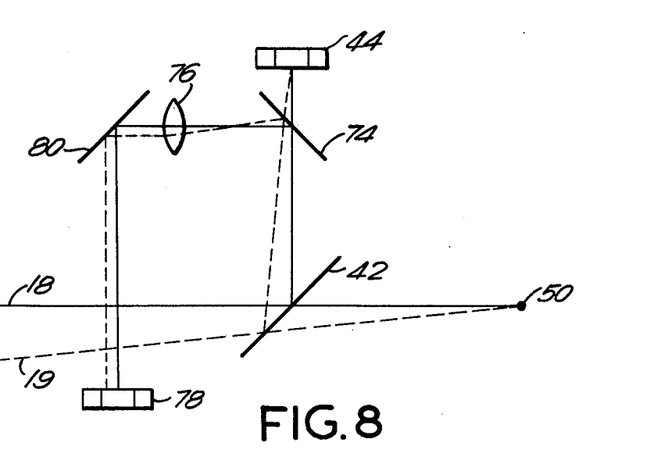
FIG. 8 is a geometric construction diagram illustrating the use of the collimator in combination with the virtual detector probe.

In the event that the orientation, as well as the intersection of the beam with point 50 is desired to be detected, the arrangement illustrated in FIG. 8 can be employed. In addition to mirror 42 and detector 44, an additional beam splitting mirror 74, spherical lens 76, and optical detector 78 are employed and function as a collimator. More specifically, detector 78 is disposed at the focus of lens 76, and lens 76 is oriented such that a beam having a predetermined orientation, and only that predetermined orientation, will fall at the dead center target point of detector 78. As shown in FIG. 8, lens 76 is oriented such that only beams parallel to beam 18 will fall on the target point of lens 78. Interposed between lens 76 and detector 78 is an optional mirror 80 which may be employed to reduce the overall size of the probe. The optical distance between the mirror 42 and the detector 78 should be within the general range of the distances $R_V$ and $R_A$, for best results. However, the distance does not in any way need to be exact.

Figure 9A:
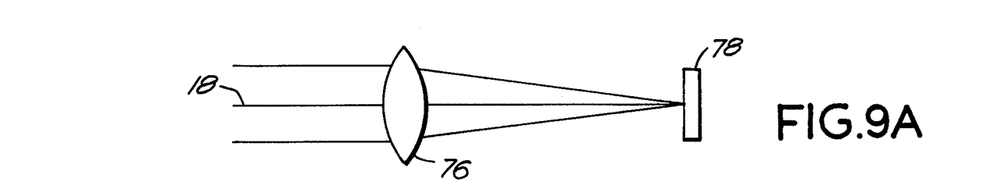
FIGS. 9A and 9B illustrate the principle embodied in the collimator employed in conjunction with the virtual detector probes.
Figure 9B:
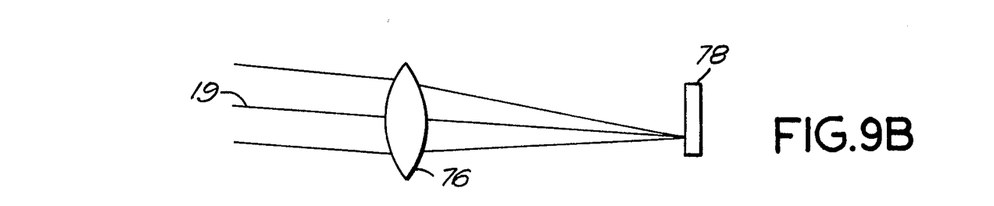

With brief reference to FIGS. 9A and 9B, it can be seen that by disposing detector 78 at the focus of lens 76, all beams parallel to the preselected beam 18 will fall on the dead center point of detector 78, while all other beams, such as beam 19 will fall elsewhere. Returning to FIG. 8, it can be seen that while both beams 18 and 19 produce a dead center indication at detector 44 due to their orientation toward point 50, only the preselected beam 18 produces the dead center indication at detector 78 as well. In this manner, the virtual detector probe is combined with a collimator to not only determine intersection of the beam with point 50 but the intersection from a particular direction as well. The combination of the virtual detector probe and the collimator illustrated in FIG. 8 can readily determine not only the proper position of the bore in FIG. 1, but can also determine whether the bore is parallel to the laser beam. Many other uses for the virtual detector probe/collimator will be readily apparent to those skilled in the art.

Figure 10:
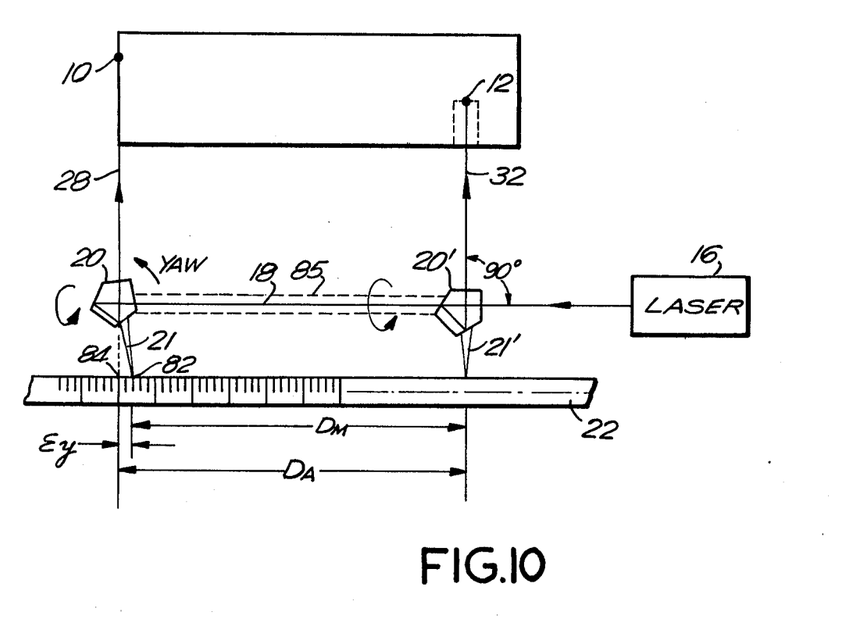
FIG. 10 is a top plan view of the laser measurement system illustrated in FIG. 1, showing in detail the error produced by a yaw in the penta-prism module.
Figure 11:
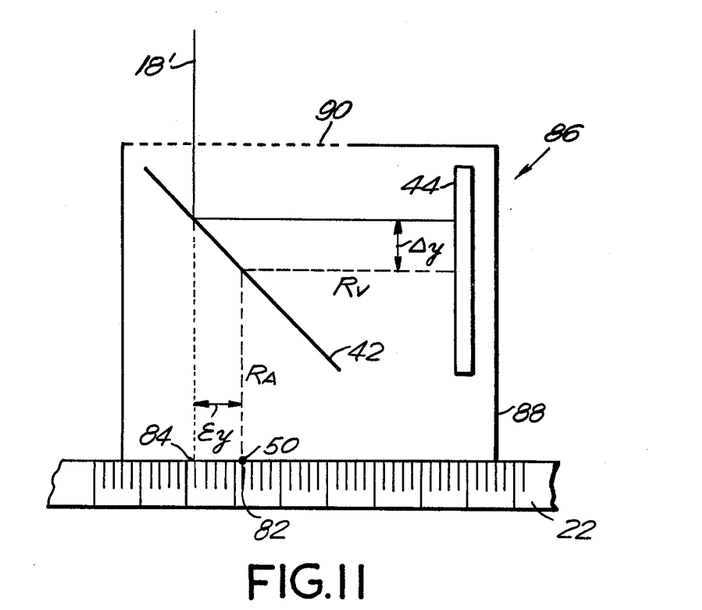
FIG. 11 is an illustration of the carriage yaw compensator in accordance with another aspect of the invention which detects, and compensates for, yaw errors as illustrated in FIG. 10.

A further use of the virtual detector probe as a carriage yaw compensator will now be discussed with reference to FIGS. 10 and 11. FIG. 10 is a top view of an arrangement shown in FIG. 1. The penta-prism in position 20' is rotated about the laser beam axis to produce plane 32, and the position of the penta-prism is adjusted along the laser beam axis until a null is produced by the detector at target 12. Upon the alignment of plane 32 with target 12, a reading of the location of the penta-prism module along the laser beam axis is taken from scale 22 by means of cursor 21' which is fixedly attached to the penta-prism module. By reading the position of the cursor 21' along the scale 22, the relative location of target point 12 along the laser beam axis can be determined.

The penta-prism may then be moved along a carriage symbolically illustrated by reference numeral 85 to position 20 to thereby determine the position of target point 10. As shown, the penta-prism has undergone a yaw due to either a nonlinearity in the carriage 85, or improper placement of the penta-prism if separate penta-prisms are employed. Although a yaw error has occurred, the plane 28 will still be perpendicular to the input laser beam 18, as more fully described in the above mentioned U.S. Pat. Nos. 4,297,031 and 4,382,680. Due to the yaw error, the cursor 21 does not lie in the same plane as the generated plane 28. Thus, although cursor 21 indicates a position of target 10 corresponding to point 82 on the scale 22, the actual correspondence of the target point is to point 84 on the scale, point 84 lying in the same plane as plane 28. The resulting yaw error is illustrated as $\epsilon_y$, leading to a measured value, $D_M$ which may be significantly different than the actual value, $D_A$.

An alternative embodiment of the virtual detector probe may be employed to detect and correct such errors in a straightforward manner. With reference to FIG. 11, the carriage yaw compensator 86 includes housing 88 having a window 90 at one portion thereof. Disposed within the housing 88 and relative to window 90 is mirror 42 and detector 44, both of which correspond to the associated structures discussed with reference to FIGS. 2 and 3. The mirror 42 and detector 44 are mounted within the housing relative to point 50 such that a given point on the mirror is of equal distance to point 50 and to dead center of target 44, such that, $R_A$ equals $R_V$. When this is the case, the detector 44 is virtually located on scale 22, dead center of the detector being located at point 50.

In operation, the carriage yaw compensator 86 is placed on the scale 22 such that point 50 is aligned with point 82 as determined by the cursor. By rotating penta-prism 20 until it produces beam 18' which enters the compensator 86, an error signal proportional to any yaw error will be produced. Any incident laser beam which would intersect points 82 or 50 would produce a zero error indication at detector 44. However, with penta-prism 20 having the yaw error as shown in FIG. 10, reflected laser beam 18' produced by the penta-prism 20 would be directed to point 84 on the scale, rather than to point 82, due to the yaw error. The error, $\Delta_y$ is produced by detector 44, thereby providing a direct indication of the yaw error $\epsilon_y$. The signal $\Delta_y$ may be directly converted to the yaw error $\epsilon_y$ to thereby automatically compensate therefor.

The use of the carriage yaw compensator described above is very beneficial in providing an extremely precise and accurate reading of scale 22. Rather than merely rotating the penta-prism until the laser beam impinges upon the scale, which would produce a relatively wide spot on the scale 22 (and accordingly reducing the available precision of the system), by placing the carriage yaw compensator 86 on the scale, a direct and precise readout from detector 44, indicative of the error in the measurement taken, is directly available. Also, it may not be physically possible to direct the laser beam 18 onto the scale, due to the particular orientation of the scale, a limitation in the angle of rotation of the penta-prism or due to an obstruction between the penta-prism and the scale. In such case, the compensator 86 can readily be adapted to accommodate for such situations by employing the techniques described in conjunction with the virtual detector probe. That is, the distances $R_A$ and $R_V$, as well as the orientation of the mirror 42, and the number of mirrors, can each be adjusted to project the detector 44 to the precise position on the scale 22 from a more convenient location.

The precision and accuracy available through the use of the techniques described above are far beyond the capabilities of prior art systems. Although the use of the virtual detector probe and the carriage yaw compensator has been described in the measurement embodiment illustrated in FIG. 1, the virtual detector probe and carriage yaw compensator may be used independently, in other systems, if so desired.

Although the invention has been described with respect to specific embodiments of the apparatus and process thereof, it is readily apparent that modifications, alterations, or changes may be made without departing from the spirit and scope of the invention as defined by the following claims.

What is claimed is:

1. An optical device for use with a laser beam to locate the position of a measurement point, comprising:
    detector means having a target point for sensing a laser beam;
    mirror means for reflecting a laser beam toward said detector means;
    a probe element having an end point adapted to be placed on a desired measurement point; and
    means for mounting said detector means, said at least one mirror and said probe element with respect to each other such that a laser beam directed toward said desired measurement point and reflected by said mirror means will fall on said target point when said probe end point is placed on said desired measurement point.

2. The optical device of claim 1 wherein said target point of said detector means is spaced from the surface of said mirror means a distance along the optical path of said reflected laser beam equal to the distance of said surface from said desired measurement point whereby the virtual location of said target point at said desired measurement point will be substantially unaffected by movements of said optical device as long as said probe end point remains on said desired measurement point.

3. An optical device for use with a laser beam comprising:
    an optical detector having a target point;
    at least one mirror having a plane surface adapted to reflect a laser beam along an optical path toward said optical detector; and
    a probe means having an end point for placing on a desired measurement point, the distance between any given point on said plane surface of said at least one mirror and the end point of said probe means being fixed and substantially equal to the optical distance along the reflected path of said laser beam between said given point and said target point.

4. The optical device of claim 3 wherein said optical distance between said given point and said target point of said optical detector is fixed so that said target point is virtually located at said desired measurement point when said probe end point is placed on said measurement point, the virtual location of said target point at the desired measurement point being substantially unaffected by movements of said optical device as long as said probe end point remains on said desired measurement.

5. The optical device of claim 4 wherein said optical path comprises points on at least two mirrors.

6. The optical device of claim 4 wherein said device further comprises housing means for fixedly accomodating said optical detector, said at least one mirror and said probe means, and window means in said housing means for passing a laser beam to said one mirror.

7. The optical device of claim 6 wherein said distance between said given point and said end point of said probe means is generally along a first axis, said optical distance is generally along a second axis, and the angle between said first and second axes is approximately 90°.

8. The optical device of claim 6 wherein said distance between said given point and said end point of said probe means is generally along a first axis, said optical distance is generally along a second axis, and the angle between said first and second axes is substantially greater than or less than 90°.

9. The optical device of any one of claims 1-8 further comprising collimator means for detecting the angle of incidence of said laser beam on said device.

10. The optical device of any of claims 3-8 further comprising:
a focusing lens;
a second optical detector; and
beam splitting mirror means disposed along the optical path between said at least one mirror and said target point for passing a first portion of said laser beam to said target point and for reflecting a second portion of said laser beam toward said second optical detector via said focusing lens,
and wherein said second optical detector is substantially located at the focal point of said focusing lens, whereby said second optical detector can detect the angle of incidence of said laser beam on said at least one mirror.

11. A method of detecting whether the axis of a laser beam is passing through a desired measurement point, comprising the steps of;
(i) disposing at least one mirror with plane surface located a preselected distance form said desired measurement point;
(ii) directing the axis of the laser beam toward said desired measurement point while reflecting said laser beam off said at least one mirror;
(iii) detecting the location of said reflected laser beam with an optical detector having a target point located thereon separated from said surface on said mirror along the optical path of said reflected laser beam a distance substantially equal to said preselected distance; and
(iv) adjusting the point of reflection of said laser beam on said at least one mirror until the reflected laser beam falls on said target point on said optical detector.

12. The method of claim 11 wherein said target point on said optical detector and said one mirror are fixed with respect to each other and are moveable with respect to said desired measurement point as long as said mirror is disposed said predetermined distance from said desired measurement point.

13. The method of claim 12 wherein said step of reflecting includes reflecting said laser beam off a single mirror.

14. The method of claim 12 wherein said step of reflecting includes reflecting said laser beam off at least two mirrors.

15. The method of any one of claims 11-14 further comprising the step of detecting the angle of incidence of said laser beam on said optical detector.

16. The method of claim 15 wherein the step of determining the angle of incidence includes the steps of disposing a beam splitting mirror between said at least one mirror and said optical detector for passing a portion of the laser beam to said first optical detector and for reflecting a second portion of said laser beam toward a second optical detector via a focusing lens, and disposing said second optical detector substantially at the focal point of said lens, whereby said second optical detector can detect said angle of incidence.

17. An optical device for use with a laser measurement system including a scale, comprising:
a housing having a predetermined point thereon, adapted to be placed on said scale in said measurement system;
an optical detector having a target point; and
at least one mirror adapted to reflect a laser beam toward said optical detector; and
means for mounting said optical detector and said at least one mirror relatively on said housing such that said target point is virtually located optically at said predetermined point on said scale when said housing is placed on said scale.

18. An optical device for use with a laser measurement system including a scale, comprising:
a housing adapted to be placed substantially adjacent to said scale in said measurement system;
an optical detector having a target point;
at least one mirror having a plane surface adapted to reflect a laser beam toward said optical detector; and
indication means disposed on said housing for defining an indication point cooperating with said scale;
and wherein said optical detector and said at least one mirror are relatively disposed such that the distance between said surface of said at least one mirror and said indication point is substantially equal to the optical distance between said surface and said target point.

19. In a laser measurement system wherein a rotatable penta-prism reflects an incident laser beam substantially perpendicular to said incident laser beam, a method of detecting an error in the indicated position on a measurement scale produced by indication means operatively disposed on said penta-prism, comprising:
disposing at least one mirror at a predetermined angle and distance relative to said indicated position on said scale;
disposing an optical detector having a target point at a predetermined position relative to said at least one mirror and said indicated position;
rotating said penta-prism such that said laser beam reflected by said penta-prism is further reflected by said at least one mirror; and
detecting the location of said laser beam reflected by said at least one mirror relative to said optical detector, to thereby determine said error.

20. The method of claim 19 wherein said steps of disposing are performed such that the distance between a given point on said at least one mirror and said indicated position is substantially equal to the distance between said given point and target point.

21. A laser measurement system for precisely measuring the distance between two points on an object along a first axis, comprising:
- a laser source for providing an incident laser beam substantially parallel to said first axis;
- a penta-prism module for reflecting said incident laser beam to provide a reflected beam, said penta-prism module being rotatable to generate a plane substantially perpendicular to said incident laser beam using said reflected beam;
- a carriage upon which said penta-prism module is slidably mounted, said carriage allowing said module to be moved substantially parallel to said first axis, until a first alignment of said reflected beam with a first of said two points is detected, and to be further moved until a second alignment of said reflected beam with a second of said two points is detected;
- a scale adapted to be disposed substantially parallel tosaid first axis; and
- indicator means operatively associated with said scale for indicating on said scale the locations of said plane which produce said first and second alignments, said indicator means comprising:
- means defining an indicator point for cooperating with locations along said scale;
- an optical detector having a target point; and
- at least one mirror disposed to reflect the swept laser beam toward said optical detector;
- and wherein the distance between a given point on said at least one mirror and said indication point is substantially equal to the optical distance between said given point and said target point.

22. The system of claim 21 wherein said indicator means further comprises cursor means operatively connected to said module for movement therewith along said scale.

23. A method for measuring the distance between two points on an object along a first axis, comprising the steps of:
- reflecting a source laser beam directed substantially parallel to said first axis in a penta-prism to provide a reflected laser beam perpendicular to the source laser beam;
- moving said penta-prism substantially parallel tos aid source laser beam until a first alignment of said reflected laser beam with a first of said two pionts is detected;
- further moving said penta-prism substantially parallel to said source laser beam until a second alignment of said reflected laser beam with a second of said two points is detected; and
- reading the positions of said penta-prism module which produce said first and second alignments along a scale disposed substantially parallel to said source laser beam by:
- disposing at least one mirror with a plane surface a predetermined distance from a marker on said scale;
- disposing an optical detector with a target point said predetermined distance along an optical path from said plane surface;
- moving said at least one mirror, said marker, and said optical detector in fixed relation along said scale until the laser beam, swept by rotation of said penta-prism module at said first position, is reflected by said plane surface of said mirror to said target point and noting the position of said marker on said scale;
- repeating the preceding moving step at said second position; and
- noting the distance along said scale, between the respective noted marker position.

* * * * *